United States Patent Office 3,010,730
Patented Nov. 28, 1961

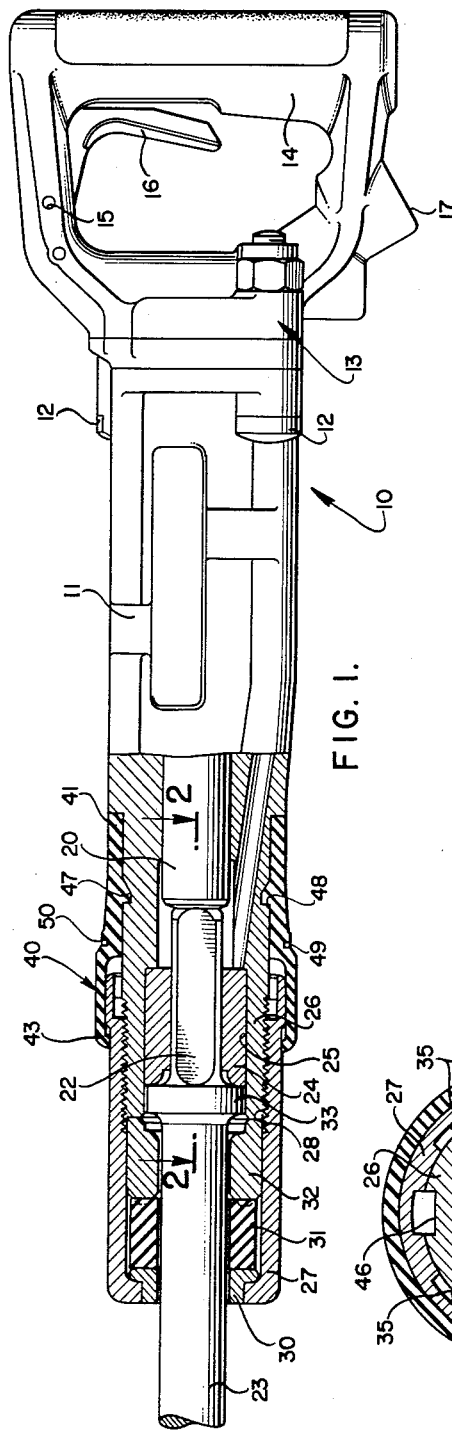

3,010,730
COUPLING WITH LOCK
George H. Fuehrer, Downey, Calif., assignor to Thor Power Tool Company, Aurora, Ill., a corporation of Delaware
Filed Aug. 16, 1960, Ser. No. 49,886
7 Claims. (Cl. 279—19)

This invention relates to coupling devices particularly designed for use in environments subject to extreme shock and vibration and more particularly to an improved coupling of this type for retaining a working tool coupled to the forward end of a pneumatic power tool and characterized in that the manually releasable locking device is normally concealed along with the coupling joint by a protective watertight shroud.

Pneumatically operated power tools designed to operate various types of working tools such as rock drills, pavement breakers, spading shovels and various other tools of this general type, have need for a readily-released tool coupling. Such couplings commonly employ a threaded retainer sleeve readily connectible and disconnectible with respect to the threaded forward end of the main body of the tool. Owing to the severe shock and vibration accompanying the operation of such tools, these retainer sleeves tend to become loose and even disconnected from the tool unexpectedly with the result that the workman is thrown off balance causing injury to the operator or others in the immediate vicinity as well as property damage.

To safeguard against these hazards, various devices have been proposed for locking the coupling in assembled position. While these have met with some degree of success, all are nevertheless subject to certain disadvantages and shortcomings sought to be avoided by the present invention. For example, it has been proposed to employ latch devices or other types of locks carried by the coupling and partially or fully exposed on the exterior of the tool. This is objectionable because of the hazard presented to the workman by the protruding parts. Furthermore, the exposed parts are likely to be damaged in the rough use to which pneumatic tools are subjected and to become fouled with mud and other debris rendering the lock device inoperative or requiring the operator to clean away the foreign matter before it is possible to operate the lock. Additionally, prior locking devices add unnecessarily to the cost of the unit and have proven costly to maintain and service.

The greatly simplified and superior locking coupling provided by the persent invention avoids the foregoing and other disadvantages of prior designs. The locking member proper comprises a single movable part mounted on the main body of the tool and having one end biased into seating engagement with one of several notches formed on the interior lip of the retainer sleeve. The spring associated with the locking member biases this member into seating engagement with one of the sleeve notches and firmly holds the coupling in locked position under all operating conditions and despite shock and vibrations accompanying normal operation of the tool. Additionally and importantly, the locking device is enclosed by a resilient smooth-surfaced protective sleeve or jacket closely embracing the body of the tool as well as the rear end of the coupling sleeve. This jacket not only conceals these parts but forms a snug watertight seal highly effective including both foreign matter and fluids. Being readily deformable, the protective jacket permits operation of the locking member through deformation of the sleeve to the extent necesstary to disengage the lock from a notch of the coupling sleeve. The protective jacket is held in assembled position frictionally and additionally by a spring keeper or the like seated within a specially formed recess for this purpose.

Accordingly, it is a primary object of the present invention to provide an improved coupling assembly for use under severe shock and vibration operating conditions and including positive means for releasably securing the coupling in any desired assembled position.

Another object of the invention is the provision of an improved tool retainer coupling for use on pneumatic power tools and incorporating a positive manually releasable lock together with an effective protective shroud safeguarding against the entry of fluids and foreign matter between the operating parts.

These and other more specific objects will appear upon reading the following specification and claims and upon considering in connection therewith the attached drawing to which they relate.

Referring now to the drawing in which a preferred embodiment of the invention is illustrated:

FIGURE 1 is a longitudinal side view of a typical pneumatic power tool, partly in cross-section and incorporating the principles of the present invention;

FIGURE 2 is a fragmentary sectional view on enlarged scale taken along line 2—2 on FIGURE 1; and FIGURES 3 and 4 are transverse cross-sectional views taken along lines 3—3 and 4—4, respectively, on FIGURE 2.

Referring more particularly to FIGURE 2, there is shown a typical light-duty pneumatic power tool designated generally 10 of a size adapted to be held in the hand of an operator. Tool 10 is of conventional design and includes a main body 11 having rigidly secured to its rear end, as by through bolts 12, a combined back head and operating handle assembly 13. The operating handle includes a handgrip 14 having pivotally supported thereon by a pin 15 a control handle 16 connected in known manner to an air control valve mechanism located within back head assembly 13. It will be understood that pressurized air is supplied to the tool through the usual flexible hose terminating in a seating socket 17 therefor opening through one side of handle assembly 13.

An automatic reversing valve mechanism within the back head assembly controls the supply of pressure air to the opposite end of a cylinder chamber formed within main body 11. Reciprocally supported within this cylinder chamber is a hammer piston the stem 20 of which terminates opposite the inner end of the non-circular shank 22 of any suitable working tool 23. Shank 22 is slidably supported loosely within a bearing sleeve 24 suitably retained in assembled position within a bore 25 extending axially through the exteriorly threaded forward end 26 of main body 11.

The coupling assembly by which working tool 23 is held detachably assembled to the forward end of tool 10 comprises a generally cup-shaped retainer or coupling sleeve 27 provided on its interior with threads 28 mating with the threaded shank end 26 of the power tool. The forward end of retainer sleeve 27 is provided with an axial opening seating a flanged bushing 30 formed in two arcuate halves and held in assembled position by an elastomeric cushion ring 31 and a retainer ring 32 which is likewise formed in two halves. The base end of tool shank 22 is annularly flanged at 33 and cooperates with retainer ring 32 and sleeve 27 in holding the working tool assembled to the pneumatic power tool.

It will be understood that the adjacent ends of bearing sleeve 24 and retainer ring 32 are so shaped and spaced relative to annular flange 33 of the working tool as to permit considerable freedom of axial movement of this tool while positively locking the same to the power unit so long as retainer sleeve 27 is properly tightened.

Referring more particularly to FIGURES 2 and 3, it is pointed out that the interior rear end of retainer sleeve 27 is formed with a plurality of circumferentially-spaced inwardly-opening notches 35 providing detent recesses into which the movable locking member is seatable to lock the retainer sleeve 27 against reverse rotation. The movable latch member per se is best shown in FIGURES 2, 3 and 4 and comprises an elongated member 36 the rear end of which is held pivotally assembled within a seat 37 of the tool body 11 by a pivot pin 38. A coil spring 39 has one end seated in a well opening through the interior side of locking lever 36 and its other end bearing against the bottom of a recess 37 formed in main body 11 and biases the forward end of the latching lever into seating engagement with one of the notches 35.

Embracing the rear end of retainer sleeve 27 at the forward end of the tool body is a protective sleeve or jacket 40 of elastomeric material, as for example, polyurethane, and capable of withstanding abusive treatment, a wide range of temperatures and not adversely affected by lubricants. Protector 40 is preferably formed in one piece with its rear end 41 shaped to seat in a recess 42 of the tool shank. Its forward end 43 is likewise shaped to fit about and resiliently embrace the rear end of retainer sleeve 27 and to merge smoothly with the outer surface of the latter. Desirably, protector 40 is so constructed that its opposite ends 41 and 43 are slightly smaller in diameter than the surfaces of the tool against which they seat with the result that these rim edges and under slightly tension after assembly. This assures that the protector will be firmly seated against the main body and against retainer sleeve 27 to prevent the possibility of moisture and other material entering beneath the protector.

To safeguard against rotation of the protector and to aid in holding it in assembled position, its interior side wall is provided with an inwardly projecting boss 45 which seats firmly in a cooperating complementally shaped recess 46. Additionally, the interior side wall of the protector is provided with an annular flange 47 seating in an annular groove 48 thereby providing a positive lock against axial displacement of the protector.

Still other means useful in holding the sleeve against displacement comprises a continuous keeper ring 49 seating in an annular groove 50 surrounding the midportion of the protector and effective in holding the juxtaposed inner wall portion of the protector firmly seated against main body 11 of tool 10. As is made clear by FIGURES 1 and 2 keeper 49 is positioned rearward of the lip end of retainer sleeve 27 so as not to interfere with the assembly and disassembly of the coupling sleeve.

The assembly of the described coupling will be quite apparent from the foregoing detailed description of the components. Assuming that the parts are disassembled, the operator passes the cutting and unshown forward end of the cutting tool 23 downwardly through the retainer sleeve from its interior after first ascertaining that bushing 30, cushion ring 31, and retainer ring 32, are in assembled position, one against the other, at the inner end of the sleeve. The tool is then prevented from dropping downwardly through these parts and through the sleeve by reason of the contact of the annular ring 33 with retainer ring 32.

The working end of many tools is too large for assembly in the manner just described. With these, assembly is accomplished by lowering retainer sleeve 27 over the shank end of the tool, and downwardly past this flange to permit the two halves of bushing 30 to be assembled within the bottom end of sleeve 27. Buffer ring 31 is then forced over flange 33 and the parts of retainer ring 32 are held about the body of tool 23 as sleeve 27 is raised toward flange 33.

The operator then holds this subassembly by grasping the foremost end of sleeve 27 and telescopes the latter into the forward end of power unit 10. As he does so, the non-circular shank end 22 of the tool is fed through the complementally shaped axial opening through bearing sleeve 24. These parts being loosely assembled, the operator next rotates sleeves 27 to thread is rearwardly onto the threaded end 26 of the power unit, this operation being continued until the rear end of retainer ring 32 is firmly seated against the foremost radial end surface of the tool body. During further assembly rotation of sleeve 27, the operator will also need to depress the side wall of protector sleeve 40 opposite locking lever 36 thereby pressing this lever inwardly in opposition to spring 39. The locking lever must be held depressed in this manner during continued assembly rotation of sleeve 27. Once the sleeve has been fully tightened, the pressure on lever 36 is released and the retainer sleeve is rotated by slight amount required to permit seating of the latch lever in one of locking notches 35. As this seating occurs, the operator will detect a definite click as the latch lever rides off the edge of the notch and seats firmly against the bottom wall of one of notches 35.

It is pointed out that protective jacket 40 preferably has molded into its exterior appropriate indicia such as the word "Press" at a point located diametrically opposite inwardly extending boss 45 of the sleeve. This location assures that the indicia will be directly opposite the latching lever. The letter "E" of the indicia is also preferably encircled directly over the area of maximum lever operating effectiveness.

The tool may now be used in the usual way as the operator grasps handgrip 14 in the right hand and the forward end of the tool in the vicinity of protector 40 in his left hand. Depression of the control lever 16 of the air valve then permits the desired quantity of air to flow through the valve into the operating chamber to reciprocate the piston hammer and impart rapid percussive blows to the shank end 22 of working tool 23. There is no danger of the locking lever 36 becoming released so long as the shank of the tool is firmly grasped in the hand. Only by deliberate depression of the jacket directly opposite lever 36 is it possible to press this lever out of the locking notch 35 in which it is seated. Accordingly, it is impossible for the coupling to work loose or to become loose accidentally.

When it is desired to change the tool or to loosen the coupling for any reason, the operator merely firmly depresses jacket 40 directly opposite lever 36 and holds it depressed while applying a loosening rotary movement to retainer sleeve 27. The lever must, of course, be held depressed until the sleeve is rotated to a position beyond the end of lever 36.

While the particular coupling with lock herein shown and disclosed in detail is fully capable of attaining the objects and providing the advantages hereinbefore stated, it is to be understood that it is merely illustrative of the preferred embodiments of the invention and that no limitations are intended to the details of construction or design herein shown other than as defined in the appended claims.

I claim:

1. In combination with a pneumatically actuated tool, a coupling assembly for detachably securing a tool assembled to the forward end thereof, said coupling including a retainer sleeve having threads mating with threads formed on the forward end of said tool and cooperable therewith to hold a working tool assembled thereto, spring-pressed manually releasable lock means normally locking said retainer sleeve in assembled position, and flexible walled fluid-tight jacket means bridging the joint between the body of said pneumatic tool and said retainer sleeve and readily deformable from the exterior thereof to release said lock means and permit adjustment of said retainer sleeve.

2. The combination defined in claim 1, characterized in the provision of a split ring spring keeper encircling said flexible jacket means and effective to hold the same compressed against underlying portions of said pneumatic tool.

3. The combination defined in claim 1 characterized in that said jacket means has a portion thereof seated in an outwardly opening recess in the side of said pneumatic tool and cooperating therewith to hold said jacket means against displacement axially of said pneumatic tool.

4. In combination with a lightweight hand-held pneumatic power tool, a working tool retainer assembly at the forward end of said tool, said retainer assembly comprising an internally threaded retainer sleeve adapted to be rotatably assembled over the externally threaded end of said power tool, the rearwardly facing lip of said sleeve having inwardly opening notches therein closed at their outer radial ends and distributed circumferentially of said lip, and spring biased latch means supported for limited radial movement into and out of locking engagement with the inner radial ends of said notches of said retainer sleeve, a portion of said latch means being manually actuatable to move the same inwardly out of locking engagement and to release said retainer sleeve for rotation.

5. The combination defined in claim 4 characterized in that said latch means includes means pivotally connecting the same to the body of a pneumatic power tool for movement longitudinally of said tool.

6. In combination with a lightweight hand-held pneumatic power tool, a working tool retainer assembly at the forward end of said tool, said retainer assembly comprising an internally threaded retainer sleeve adapted to be rotatably assembled over the externally threaded end of said power tool, the rearwardly facing lip of said sleeve having inwardly opening notches therein, spring biased latch means supported for limited radial movement into and out of locking engagement with the notches of said retainer sleeve, a portion of said latch means being manually actuatable to move the same out of locking engagement and to release said retainer sleeve for rotation, and an elastomeric protective sleeve encircling the notched end of said retainer sleeve and snugly embracing the juxtaposed exterior surface of said retainer sleeve and of said pneumatic tool to prevent the entrance of fluids and foreign material into said notches and the junction of said retainer with said tool.

7. A combination defined in claim 6 characterized in the provision of a single resilient keeper embracing said elastomeric protective sleeve and effective in holding the same in assembled position on the forward end of said pneumatic tool.

References Cited in the file of this patent
UNITED STATES PATENTS

| | | |
|---|---|---|
| 1,142,671 | Carmina | June 8, 1915 |
| 1,481,643 | Jimerson | Jan. 22, 1924 |
| 1,787,178 | Stevens | Dec. 30, 1930 |
| 2,108,032 | Allen | Feb. 15, 1938 |

UNITED STATES PATENT OFFICE
CERTIFICATE OF CORRECTION

Patent No. 3,010,730                  November 28, 1961

George H. Fuehrer

It is hereby certified that error appears in the above numbered patent requiring correction and that the said Letters Patent should read as corrected below.

Column 1, line 66, for "cluding" read -- excluding --; line 69, for "necesstary" read -- necessary --; column 3, line 30, for "and under slightly" read -- are under slight --; column 4, line 4, for "sleeves" read -- sleeve --; same line 4, for "is" read -- it --; line 16, for "by" read -- any --.

Signed and sealed this 31st day of July 1962.

(SEAL)
Attest:

ERNEST W. SWIDER                            DAVID L. LADD
Attesting Officer                              Commissioner of Patents